United States Patent
Kim et al.

(10) Patent No.: US 12,401,439 B2
(45) Date of Patent: Aug. 26, 2025

(54) PROPAGATION CHANNEL SIMULATION METHOD AND APPARATUS

(71) Applicant: ELECTRONICS AND TELECOMMUNICATIONS RESEARCH INSTITUTE, Daejeon (KR)

(72) Inventors: Jun Seok Kim, Daejeon (KR); Jong Soo Lim, Daejeon (KR); Young Jun Chong, Daejeon (KR); Ju Yeon Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 156 days.

(21) Appl. No.: 18/514,179

(22) Filed: Nov. 20, 2023

(65) Prior Publication Data
US 2024/0214093 A1    Jun. 27, 2024

(30) Foreign Application Priority Data
Dec. 26, 2022    (KR) .................. 10-2022-0184976

(51) Int. Cl.
*H04B 17/00*    (2015.01)
*H04B 17/391*    (2015.01)

(52) U.S. Cl.
CPC ..... *H04B 17/3912* (2015.01); *H04B 17/0087* (2013.01)

(58) Field of Classification Search
None
See application file for complete search history.

(56) References Cited

U.S. PATENT DOCUMENTS

| 9,651,647 B2 * | 5/2017 | Owen .................. G01S 19/071 |
| 11,562,556 B1 * | 1/2023 | Kabzan .............. G06V 10/7747 |

(Continued)

FOREIGN PATENT DOCUMENTS

| JP | 5076156 B2 | 11/2012 |
| KR | 10-0941391 B1 | 2/2010 |

(Continued)

OTHER PUBLICATIONS

Yi Chen et al., "Channel Measurement and Ray-Tracing-Statistical Hybrid Modeling for Low-Terahertz Indoor Communications", IEEE Transactions on Wireless Communications, vol. 20, No. 12, pp. 8163-8176, Dec. 10, 2021.

*Primary Examiner* — Wilson Lee
(74) *Attorney, Agent, or Firm* — Rabin & Berdo, P.C.

(57) ABSTRACT

Exemplary embodiments provide a method of correcting a result of a ray tracing-based propagation channel simulation. The method of correcting propagation channel simulation data, includes: determining an intensity error value of a propagation channel simulation model for a propagation path associated with each object in a space for which a three-dimensional (3D) environment map is given and storing the intensity error value in a storage device; performing a propagation channel simulation for an arbitrary pair of a transmitter position and a receiver position in the space to obtain multipath components; determining an object having influenced propagations of the multipath components in the space; and correcting an intensity of at least one of the multipath components by applying the intensity error value associated with a determined object stored in the storage device.

18 Claims, 5 Drawing Sheets

(56) References Cited

U.S. PATENT DOCUMENTS

| | | | |
|---|---|---|---|
| 2017/0374561 A1* | 12/2017 | Zhang | H04W 24/08 |
| 2018/0131575 A1 | 5/2018 | He et al. | |
| 2020/0225673 A1* | 7/2020 | Ebrahimi Afrouzi | ............... A47L 11/4011 |
| 2022/0050211 A1* | 2/2022 | Bennington | G01S 19/06 |
| 2022/0157000 A1* | 5/2022 | Assouline | G06V 40/23 |
| 2023/0152796 A1* | 5/2023 | Zhang | B60W 10/184 |
| | | | 701/2 |

FOREIGN PATENT DOCUMENTS

| | | |
|---|---|---|
| KR | 10-2010-0069351 A | 6/2010 |
| KR | 10-2012-0070148 A | 6/2012 |
| KR | 10-2016-0003501 A | 1/2016 |
| KR | 20190125624 A | 11/2019 |
| KR | 20210026520 A | 3/2021 |

* cited by examiner

PROPAGATION CHANNEL SIMULATION METHOD AND APPARATUS

CROSS-REFERENCE TO RELATED APPLICATION

The present application claims a convention priority under 35 U.S.C. § 119(a) based on Korean Patent Application No. 10-2022-0184976 filed on Dec. 26, 2022, the entire content of which is incorporated herein in its entirety by reference.

BACKGROUND

1. Technical Field

The present disclosure relates to a propagation channel simulation method and apparatus and, more particularly, to a method and apparatus for effectively correcting a ray tracing-based propagation channel simulation result.

2. Related Arts

A propagation channel is a physical concept for explaining how an electromagnetic signal propagates in a medium between a transmitter and a receiver. Information on the propagation channel may be required in wireless communications using the electromagnetic signal. The propagation channel may be expressed by a channel impulse response representing a signal strength or signal intensity according to a delay caused in the propagation of the RF signal from the transmitter to the receiver, an angle of departure (AoD) at the transmitter, and an angle of arrival (AoA) at the receiver. Information on the propagation channel may be used in a design of a communications system and a communication algorithm as a propagation channel model. For example, the propagation channel may be estimated to demodulate signals in the receiver of an actual communications system, and the information on actual propagation channels in an environment may be utilized in a design of a communications network.

It may be ideal to accurately measure the propagation channel for every possible pair of transmitter and receiver positions in a wireless environment, which may require lots of man-hours for measuring the signal strength using a precise propagation channel measurement equipment. Considering the time and labor required for the measurement, however, it is unrealistic to measure the propagation channel for every pair of transmitter and receiver positions. Accordingly, the information on the propagation channel has been acquired conventionally through a simulation by constructing a three-dimensional (3D) environment map and performing the propagation channel simulations for arbitrary pairs of transmitter and receiver positions.

A ray tracing-based simulation is generally used for the propagation channel simulations, but a result of the ray tracing-based simulation generally reveals much differences from the actual wireless environment because of imperfections of the 3D environment map which does not perfectly simulate a real world in terms of object shapes and medium information and incompleteness of the propagation simulation algorithm itself. Therefore, it is necessary to improve the propagation channel simulation model persistently, and to provide a method of effectively correcting the propagation channel simulation result based on actual data when performing the propagation channel simulation in a certain space.

SUMMARY

Exemplary embodiments provide a method of correcting a propagation channel simulation result that enables to correct a result of a ray tracing-based propagation channel simulation performed for an arbitrary pair of a transmitter position and a receiver position in a three-dimensional (3D) environment map by use of an actual propagation channel measurement data for another pair of the transmitter position and the receiver position in a same space to improve an accuracy of the simulation.

Exemplary embodiments provide a propagation channel simulation method in which the method of correcting the propagation channel simulation result is applied.

Exemplary embodiments provide a propagation channel simulation apparatus for performing the propagation channel simulation method.

According to an aspect of an exemplary embodiment, a method of correcting propagation channel simulation data, includes: determining an intensity error value of a propagation channel simulation model for a propagation path associated with each object in a space for which a three-dimensional (3D) environment map is given and storing the intensity error value in a storage device; performing a propagation channel simulation for an arbitrary pair of a transmitter position and a receiver position in the space to obtain multipath components; determining an object having influenced propagations of the multipath components in the space; and correcting an intensity of at least one of the multipath components by applying the intensity error value associated with a determined object stored in the storage device.

The operation of determining the intensity error value of the propagation channel simulation model for the propagation path associated with each object may include: performing actual measurements of propagation channels for a plurality of pairs of a transmitter position and a receiver position, performing provisional propagation channel simulations for the plurality of pairs of the transmitter position and the receiver position, and matching a first cluster of multipath components obtained through the actual measurements with a second cluster of multipath components obtained through the provisional propagation channel simulations; mapping the first or the second cluster to an object in the space; and calculating a difference between the first cluster of multipath components and the second cluster of multipath components with respect to a mapped object to store the difference as the intensity error value for the propagation path associated with the mapped object.

The operation of performing the actual measurements of the propagation channels, performing the provisional propagation channel simulations, and matching the first cluster of multipath components with the second cluster of multipath components may include: performing the actual measurements of the propagation channels for the plurality of pairs of the transmitter position and the receiver position in the space to obtain the first cluster of multipath components; performing the provisional propagation channel simulations for the plurality of pairs of the transmitter position and the receiver position associated with the actual measurements to obtain the second cluster of multipath components; and matching the first cluster of multipath components with the second cluster of multipath components.

Each of actual measurement data and each of provisional simulation data may include a delay, an angle of departure, an angle of arrival, and a signal intensity. The intensity error value may be determined as a function of the delay, the angle of departure, and the angle of arrival for each object in the space and stored in the storage device.

The method of correcting propagation channel simulation data may further include an operation of interpolating calculated intensity error values to supplement the intensity error values for the delay, the angle of departure, and the angle of arrival for which the intensity error values are not calculated from the first cluster of multipath components and the second cluster of multipath components.

The operation of correcting the intensity of at least one of the multipath components by applying the intensity error value associated with the determined object may include: adding the intensity error value associated with the determined object to the intensity of the at least one of the multipath components.

According to another aspect of an exemplary embodiment, a propagation channel simulation method includes: performing a propagation channel simulation for a pair of a transmitter position and a receiver object in a space for which a three-dimensional (3D) environment map is given to obtain multipath components; determining an object having influenced propagations of the multipath components in the space; and correcting an intensity of at least one of the multipath components by applying a predetermined intensity error value for the object.

The propagation channel simulation method may further include: determining the predetermined intensity error value of a propagation channel simulation model for a propagation path associated with each object in the space and storing the predetermined intensity error value in a storage device before performing the propagation channel simulation.

The operation of determining the predetermined intensity error value of the propagation channel simulation model for the propagation path associated with each object may include: performing actual measurements of propagation channels for a plurality of pairs of a transmitter position and a receiver position, performing provisional propagation channel simulations for the plurality of pairs of the transmitter position and the receiver position, and matching a first cluster of multipath components obtained through the actual measurements with a second cluster of multipath components obtained through the provisional propagation channel simulations; mapping the first or the second cluster to an object in the space; and calculating a difference between the first cluster of multipath components and the second cluster of multipath components with respect to a mapped object to store the difference as the intensity error value for the propagation path associated with the mapped object.

The operation of performing the actual measurements of the propagation channels, performing the provisional propagation channel simulations, and matching the first cluster of multipath components with the second cluster of multipath components may include: performing the actual measurements of the propagation channels for the plurality of pairs of the transmitter position and the receiver position in the space to obtain the first cluster of multipath components; performing the provisional propagation channel simulations for the plurality of pairs of the transmitter position and the receiver position associated with the actual measurements to obtain the second cluster of multipath components; and matching the first cluster of multipath components with the second cluster of multipath components.

Each of actual measurement data and each of provisional simulation data may include a delay, an angle of departure, an angle of arrival, and a signal intensity. The intensity error value may be determined as a function of the delay, the angle of departure, and the angle of arrival for each object in the space and stored in the storage device.

The propagation channel simulation method may further include: interpolating calculated intensity error values to supplement the intensity error values for the delay, the angle of departure, and the angle of arrival for which the intensity error values are not calculated from the first cluster of multipath components and the second cluster of multipath components.

According to yet another aspect of an exemplary embodiment, a propagation channel simulation apparatus includes: a memory storing program instructions; and a processor coupled to the memory and executing the program instructions stored in the memory. The program instructions, when executed by the processor, causes the processor to: perform a propagation channel simulation for a pair of a transmitter position and a receiver object in a space for which a three-dimensional (3D) environment map is given to obtain multipath components; determine an object having influenced propagations of the multipath components in the space; and correct an intensity of at least one of the multipath components by applying a predetermined intensity error value for the object.

The program instructions, when executed by the processor, may cause the processor to determine the predetermined intensity error value of a propagation channel simulation model for a propagation path associated with each object in the space and storing the predetermined intensity error value in a storage device before performing the propagation channel simulation.

The program instructions causing the processor to determine the predetermined intensity error value of the propagation channel simulation model for the propagation path associated with each object may cause the processor to: perform actual measurements of propagation channels for a plurality of pairs of a transmitter position and a receiver position, perform provisional propagation channel simulations for the plurality of pairs of the transmitter position and the receiver position, and match a first cluster of multipath components obtained through the actual measurements with a second cluster of multipath components obtained through the provisional propagation channel simulations; map the first or the second cluster to an object in the space; and calculate a difference between the first cluster of multipath components and the second cluster of multipath components with respect to a mapped object to store the difference as the intensity error value for the propagation path associated with the mapped object.

The program instructions causing the processor to perform the actual measurements of the propagation channels, perform the provisional propagation channel simulations, and match the first cluster of multipath components with the second cluster of multipath components may cause the processor to: perform the actual measurements of the propagation channels for the plurality of pairs of the transmitter position and the receiver position in the space to obtain the first cluster of multipath components; perform the provisional propagation channel simulations for the plurality of pairs of the transmitter position and the receiver position associated with the actual measurements to obtain the second cluster of multipath components; and match the first cluster of multipath components with the second cluster of multipath components.

Each of actual measurement data and each of provisional simulation data may include a delay, an angle of departure, an angle of arrival, and a signal intensity. The intensity error value may be determined as a function of the delay, the angle of departure, and the angle of arrival for each object in the space and stored in the storage device.

The program instructions, when executed by the processor, may further cause the processor to: Interpolate calculated intensity error values to supplement the intensity error values for the delay, the angle of departure, and the angle of arrival for which the intensity error values are not calculated from the first cluster of multipath components and the second cluster of multipath components.

According to an exemplary embodiment, the result of the ray tracing-based propagation channel simulation in the space in the 3D environment map may be corrected using the actual propagation channel measurement data in the same environment. Accordingly, the exemplary embodiment enables to compensate for the shortcomings of the simulation that the propagation channel simulation generally does not represent the actual channel perfectly and reveals an error from the actual data and to improve the accuracy of the propagation channel simulations.

Exemplary embodiments may be helpful for establishing a precise propagation channel model through an accurate propagation channel estimation. In addition, exemplary embodiments may improve an accuracy of a propagation channel estimation in real-time communications and allow to optimize a communication method. The exemplary embodiments may also be used in the design of the wireless communications network.

BRIEF DESCRIPTION OF THE DRAWINGS

In order that the disclosure may be well understood, there will now be described various forms thereof, given by way of example, reference being made to the accompanying drawings, in which.

Figure 1:
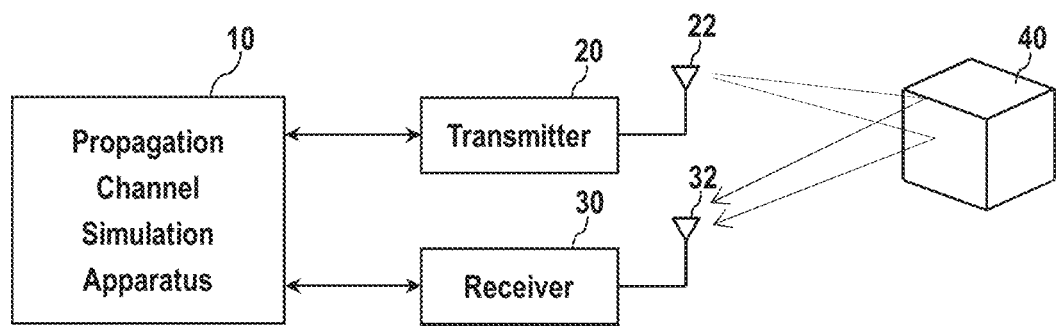
FIG. 1 is a block diagram of a propagation channel simulation system according to an exemplary embodiment of the present disclosure.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

FIG. 1 is a block diagram of a propagation channel simulation system according to an exemplary embodiment of the present disclosure. The propagation channel simulation system may include a propagation channel simulation apparatus 10, a transmitter 20, and a receiver 30.

The propagation channel simulation apparatus 10 may perform a propagation channel simulation by a ray-tracing for an arbitrary pair of a transmitter position and a receiver position in a space for which a three-dimensional (3D) environment map is given. The propagation channel simulation apparatus 10 may correct a result of the propagation channel simulation using an actual propagation channel measurement result for another pair of transmitter and receiver positions in the same space.

In detail, the propagation channel simulation apparatus 10 may perform the propagation channel simulation for an arbitrary pair of a transmitter position and a receiver positions in the space for which the 3D environment map is given to obtain multipath signal components, form clusters of the multipath signal components, and determine at least one object having influenced the propagation of each cluster. In addition, the propagation channel simulation apparatus 10 may correct intensities of the multipath signal components by adding an intensity error value associated with a determined object to the intensities of the multipath signal components. To this end, the propagation channel simulation apparatus 10 may determine in advance the intensity error values of the propagation channel simulation model for propagation paths associated with objects in the space and store and maintain the intensity error values for the objects in a database.

In order to calculate the intensity error values associated with the objects in the space, the propagation channel simulation apparatus 10 may acquire actual measurement data for the propagation channel by utilizing the transmitter 20 and the receiver 30. That is, the transmitter 20 and the receiver 30 may actually measure signal propagation data for a plurality of pairs of transmitter and receiver positions and provide actual measurement data to the propagation channel simulation apparatus 10. In an exemplary embodiment, the transmitter 20 and the receiver 30 may acquire the measured data for the plurality of pairs of transmitter and receiver positions and then provide the measured data to the propagation channel simulation apparatus 10. In this case, the measured data may include a transmit signal and/or a receive signal along with time information. In an alternative embodiment, the transmitter 20 and the receiver 30 may be coupled to the propagation channel simulation apparatus 10 through a certain network to measure the actual data for the propagation channel according to an instruction of the propagation channel simulation apparatus 10 and provide the measured data in real time or non-real time to the propagation channel simulation apparatus 10.

The electromagnetic waves radiated by an antenna 22 of the transmitter 20 may propagate to an antenna 32 of the receiver 30 through a line-of-sight path with no intervention, or may propagate while undergoing a reflection, diffraction, scattering, and so on by one or more objects 40. The propagation path may be expressed using a ray. Each object in the space between the transmitter 20 and the receiver 30 may cause multiple rays to be generated through phenomena such as the reflection, diffraction, and scattering. The rays generated by a same object in the space between the transmitter 20 and the receiver 30 may reveal similar delays, angles of departure (AoD) at the transmitter, and angles of arrival (AoA) at the receiver, and thus may be clustered according to the characteristics. Generally, the propagation channel model may categorize the rays according to the characteristics including the delays, the angles of departure at the transmitter, and angles of arrival at the receiver into clusters and represent the real environment quite well.

The propagation channel simulation apparatus 10 may form clusters of multipath components (hereinbelow, referred to as "clusters of a first clusters set") from the multipath components acquired through the actual measurements in the channel environment. Further, the propagation channel simulation apparatus 10 may form clusters of multipath components (hereinbelow, referred to as "clusters of a second clusters set") from the multipath components acquired through provisional simulations in the channel environment. The propagation channel simulation apparatus 10 may match each cluster of the first clusters set with each cluster of the second clusters set. Further, the propagation channel simulation apparatus 10 may determine which object 40 caused each of the clusters of the second clusters set to be generated and map each cluster to one of the objects.

The propagation channel simulation apparatus 10 may calculate a difference between an intensity of the actual multipath components and an intensity of the provisionally simulated multipath components for each object 40, as a simulation error, according to conditions of the delay, the angle of departure, and the angle of arrival. The propagation channel simulation apparatus 10 may perform the measurements of the multipath signal components for lots of pairs of the transmitter and receiver positions and for each condition of the delay distance, the angle of departure, and the angle of arrival to calculate the intensity error value. Further, the propagation channel simulation apparatus 10 may determine the intensity error value for each object in the 3D space based on mapping information between the clusters and the objects to establish the database of the intensity error values for the objects. Considering the limitation of the actual measurements, some of the intensity error values for all the possible conditions of the delays, the angles of departure, and the angles of arrival for the objects 40 may be added by interpolations.

Afterwards, when the propagation channel simulation apparatus 10 performs the propagation channel simulation for an arbitrary pair of the transmitter position and the receiver position, the apparatus 10 may determine an object associated with the multipath signal components based on the simulation result, i.e. the multipath signal components, and correct the intensities of the multipath signal components by adding the intensity error value associated with the determined object to the intensities of the multipath signal components.

Figure 2:
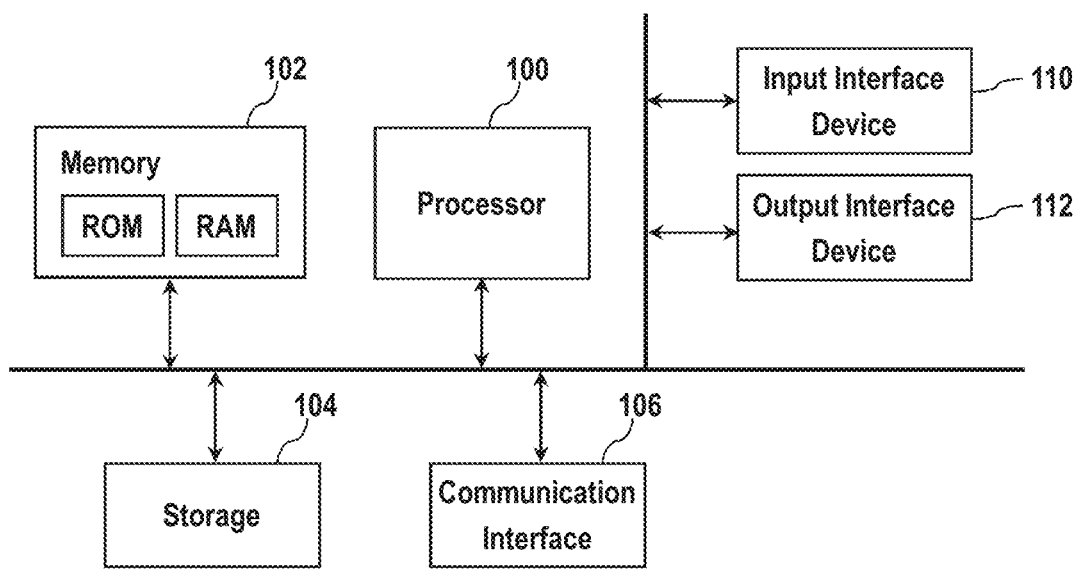
FIG. 2 is a block diagram showing a physical configuration of a propagation channel simulation apparatus shown in FIG. 1.

FIG. 2 is a block diagram showing a physical configuration of the propagation channel simulation apparatus 10. The propagation channel simulation apparatus 10 may include a processor 100, a memory 102, and a storage 104. In addition, the propagation channel simulation apparatus 10 may further include an input interface device 110 and an output interface device 112. The components of the propagation channel simulation apparatus 10 may be connected to each other by a bus.

The processor 100 may execute program instructions stored in the memory 102 or the storage 104 to perform the caricature generating method according to the present disclosure. The processor 100 may include a central processing unit (CPU) or a graphics processing unit (GPU), or may be implemented by another kind of dedicated processor suitable for performing the method of the present disclosure. The processor 100 may execute program instructions for implementing the propagation channel simulation method according to an exemplary embodiment.

The memory 102 may include, for example, a volatile memory such as a read only memory (ROM) and a nonvolatile memory such as a random access memory (RAM). The memory 102 may load the program instructions stored in the storage 104 to provide to the processor 100 so that the processor 100 may execute the program instructions. In addition, the memory 102 may temporarily store data generated in the course of the execution of the program instructions for the propagation channel simulation.

The storage 104 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD). The storage 104 may store the program and database for implementing the propagation channel simulation method according to an exemplary embodiment.

The communication interface 106, which may include one or more of a wireless local area network (WLAN) interface, a power line communications (PLC) module, a fourth-generation (4G) long term evolution (LTE) or a fifth-generation (5G) new radio (NR) interface, or a similar communication interface, may enable the propagation channel simulation apparatus 10 to communicate with the transmitter 20 and/or the receiver 30. The input interface device 110 allows a user, i.e. an operator, to manipulate or input commands for the propagation channel simulation apparatus 10, and the output interface device 112 may display an operating status and an operating result of the propagation channel simulation apparatus 10.

Figure 3:
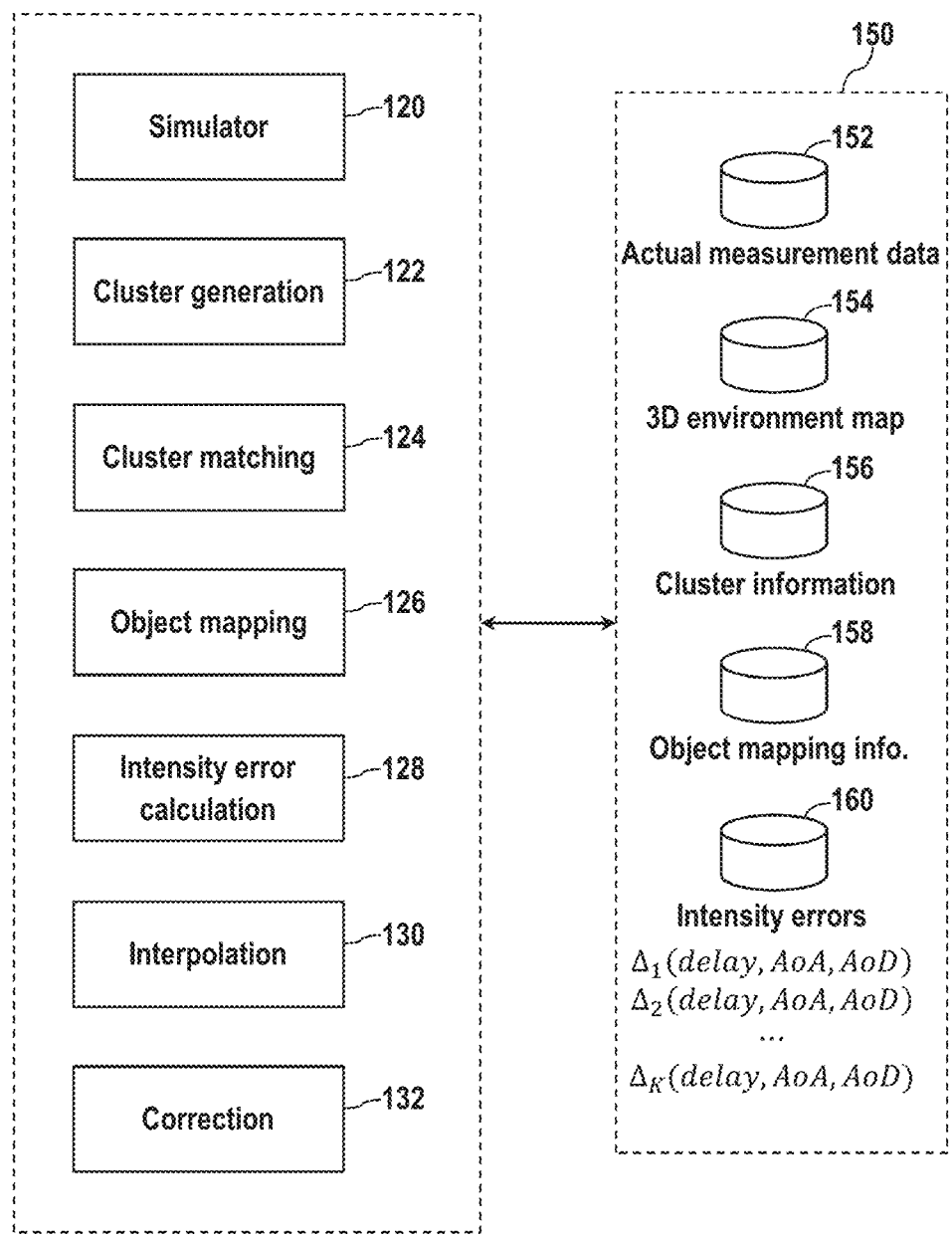
FIG. 3 is a block diagram of a propagation channel simulation program executed by the propagation channel simulation apparatus.

FIG. 3 is a block diagram of a propagation channel simulation program executed by the propagation channel simulation apparatus 10. The propagation channel simulation program may include a simulator 120, a cluster generation unit 122, a cluster matching unit 124, an object mapping unit 126, an intensity error calculation unit 128, an interpolation unit 130, and a correction unit 132, and a database 150. The database 150 may include an actual measurement data table 152, a 3D environment map table 154, a cluster information table 156, an object mapping information table 158, and an intensity error table 160.

In the database 150, the actual measurement data table 152 may store signal propagation data actually measured for a plurality of pairs of the transmitter and receiver positions using the transmitter 20 and the receiver 30. The 3D environment map table 154 may store 3D environment map data for the space where propagation channel simulation is performed. The cluster information table 156 may store information on clusters of the multipath components of the first clusters set obtained through the actual measurements and clusters of the multipath components of the second clusters set obtained through the simulation during the execution of the program. The object mapping information table 158 may store mapping information between the clusters and the objects in the 3D environment map during the program execution. The intensity error table 160 may store the intensity error values calculated for each object in the 3D environment map. In an exemplary embodiment, a plurality of intensity error values Δ1-ΔK may be stored for each object as a function of the delay, the angle of departure, and the angle of arrival.

The simulator 120 performs the ray tracing-based propagation channel simulation in the 3D environment map. In particular, in order to establish the intensity error table 160 for each object to be used for the correction of the simulation result, the simulator 120 may perform the provisional simulations under the same conditions including the transmitter and receiver positions, the delays, the angles of departure, and the angles of arrival as those associated with each of the actual measurement data. In addition, after the intensity error table 160 is established, the simulator 120 may perform the propagation channel simulation for arbitrary transmitter positions and receiver positions.

The cluster generation unit 122 may generate the clusters of the multipath components from the actual measurement data, i.e., the clusters of the first clusters set, and the clusters of the multipath components from the simulation result data, i.e., the clusters of the second clusters set. The cluster generation unit 122 may store information of the clusters of the first and the second clusters set in the cluster information table 156 of the database 150.

The cluster matching unit 124 may match each of the clusters in the first clusters set having been obtained through the actual measurements with at least one of the clusters in the second clusters set obtained through the simulation under the same condition of the transmitter and receiver positions, the delay, the angle of departure, and the angle of arrival as those for the cluster in the first clusters set.

The object mapping unit 126 may map the clusters, in particular, the clusters in the second clusters set, with the objects in the 3D environment map based on the information on the clusters of the second clusters set and the 3D environment map information. Depending on the embodiments, the cluster matching unit 124 and the object mapping unit 126 may be combined into a single module.

The intensity error calculation unit 128 may calculate the difference between the intensity of the actual multipath component and the intensity of the simulated multipath component according to the conditions of the delay, the angle of departure, and the angle of arrival for each object 40 as the simulation error for the object 40. In case where there are two or more multipath components for an object and for the same or similar conditions of the delay, the angle of departure, and the angle of arrival, an average of the intensities of the multipath components for the object 40 and for the conditions may be used for calculating the simulation error, that is, the intensity error value.

That is, after performing the actual measurements of the multipath components for multiple pairs of transmitter and receiver positions, performing the provisional propagation simulation for the pairs of transmitter and receiver positions, obtaining the clusters of the first and the second clusters set, and mapping the first clusters set to the second clusters set, the propagation channel simulation apparatus 10 may determine the simulation error, that is, the intensity difference for each cluster based on the matching between the clusters. Further, the propagation channel simulation apparatus 10 may map each of the clusters to one of the objects based on the 3D environment map used in the simulation model and determine the intensity error value for each object in the 3D space to store in the intensity error table 160 of the database 150.

The interpolation unit 130 may interpolate the intensity error values. It is desirable that the intensity error values calculated by the intensity error calculation unit 128 and stored in the intensity error table 160 are acquired for all objects 40 and for all possible values of the delay, the angle of departure, and the angle of arrival, so that the intensity error values stored in the database may be retrieved and used as a function of the delay, the angle of departure, and the angle of arrival. However, the intensity error values may not be obtained through the above-described process including the actual measurement, the simulation, and matching the clusters for some object 40 or for some of the conditions of the delay, the angle of departure, and/or the angle of arrival for some of the objects 40 due to limitations in the actual measurements. The interpolation unit 130 may perform the interpolation to determine the intensity error values for the conditions for which the intensity error values are not present.

When the simulator 120 performs the propagation channel simulation for an arbitrary pair of the transmitter and receiver positions in a state that the intensity error values are accumulated in the intensity error table 160, the correction unit 132 may cause the cluster matching unit 124 and the object mapping unit 126 to form a cluster of the multipath signal components from a new simulation result and determine an object associated with the multipath signal components, that is, the multipath signal components. Further, the correction unit 132 may correct the intensities of the multipath signal components by adding the intensity error value associated with a determined object to the intensities of the multipath signal components obtained through the simulation.

The operation of the propagation channel simulation apparatus 10 will be described in more detail with reference to FIGS. 4-8.

The propagation channel simulation apparatus 10 may build the intensity error value table 160 to be used for the correction of simulation results. In a state that the intensity error value table 160 is established, the propagation channel simulation apparatus 10 may perform the propagation channel simulation for an arbitrary transmitter and receiver positions to obtain a simulation result and correct the simulation result using the intensity error value stored in the table 160.

Figure 4:
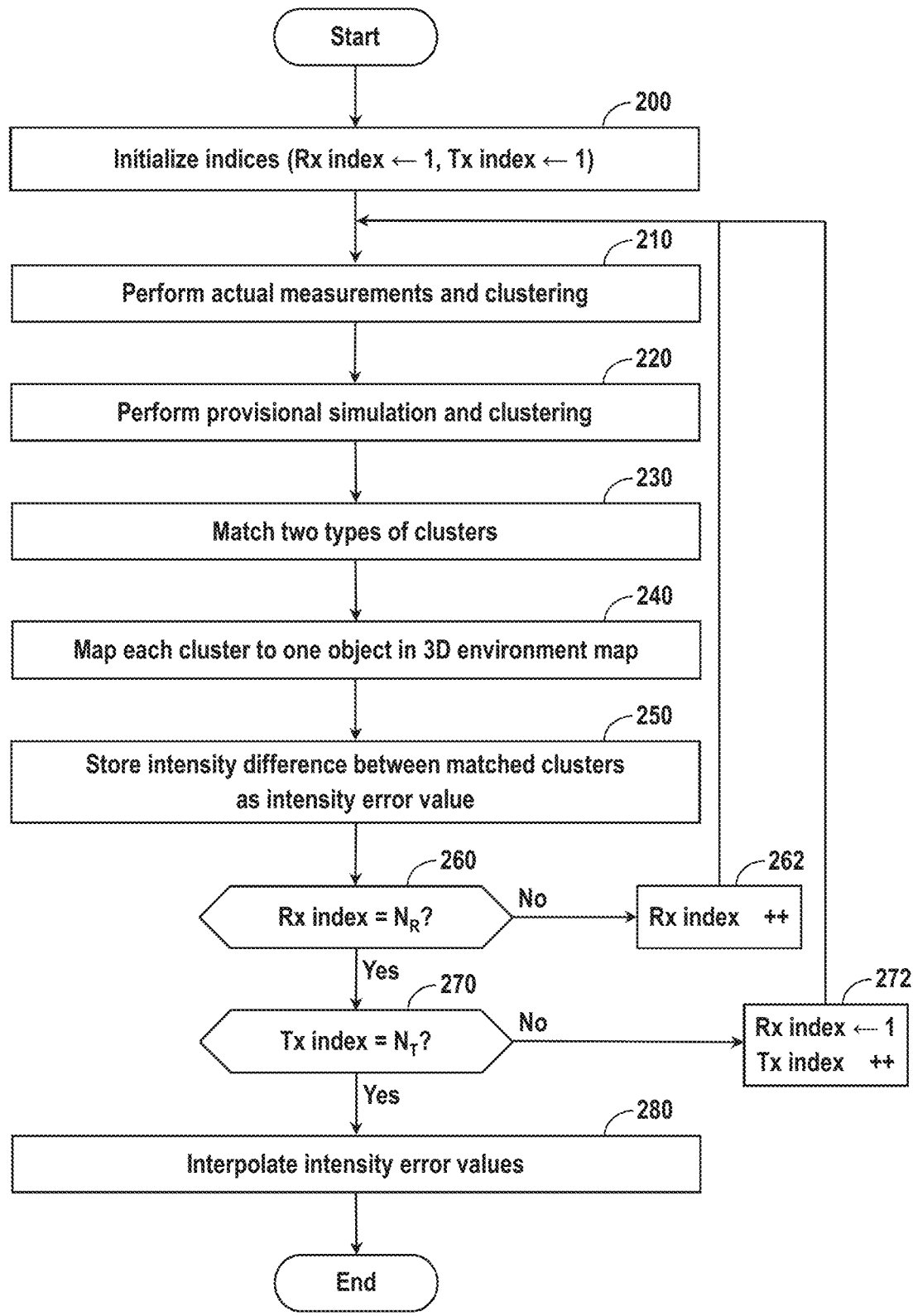
FIG. 4 is a flowchart showing a process of building an intensity error value database to be used for a correction of a simulation result.

FIG. 4 is a flowchart showing a process of building the intensity error value table 160 to be used for the correction of the simulation result.

Here, it is assumed that the actual number of transmitter positions and the number of receiver positions in the 3D space are NT and NR, respectively. The propagation channel simulation apparatus 10 performs the actual measurements of the propagation channel for each transmitter position and receiver position in the real environment, and performs the ray-tracing-based provisional simulation of the propagation channel for the same transmitter and receiver positions as the actual measurements in the 3D environment map. To this end, the propagation channel simulation apparatus 10 first initialize an index of the receiver position Rx_index and an index of the transmitter position Tx_index) (operation 200).

Figure 5:
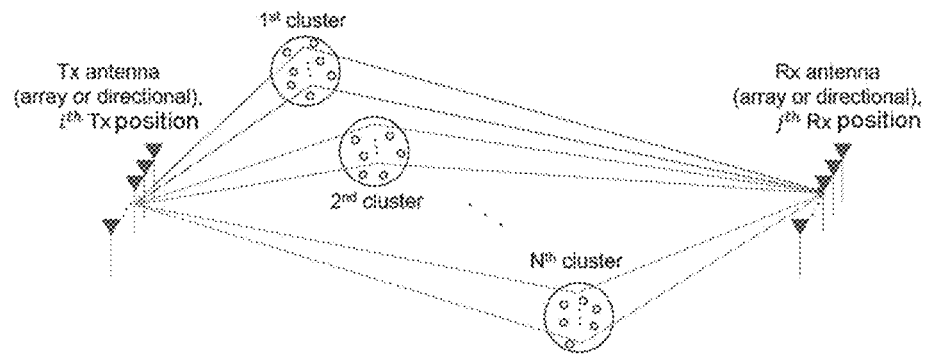
FIG. 5 is a conceptual diagram depicting a process of measuring a propagation channel between a transmitter position and a receiver position in an actual environment.

In operation 210, the actual measurements of the propagation channel is performed and the multipath components in the actual measurement data are clustered. FIG. 5 is a conceptual diagram depicting the process of actually measuring the propagation channels between the transmitter position and the receiver position in the actual environment. In an exemplary embodiment, array antennas may be used for the transmitter antenna 22 and the receiver antenna 32 to measure the directionality of the multipath components. In an alternative embodiment, however, directional antennas may be used for the transmitter antenna 22 and the receiver antenna 32 and the antennas may be physically rotated. The propagation channels may be measured for various transmitter and receiver positions in the 3D space. The signal originating from the transmitter antenna 22 encounters obstacles in its path and undergoes various propagation phenomena such as the reflection, diffraction, and scattering by the obstacles and before reaching the receiver antenna 32, and the measured propagation channel may be represented by signal intensities as a function of the delay, the angle of departure, and the angle of arrival. Each object in the space may act as one of the obstacles and cause the multipath components to be generated through the reflection, the diffraction, and the scattering. The multipath components generated by the same object may have similar delays, angles of departure, and the angles of arrival and may show a cluster pattern. The clustering of the multipath components may be achieved using algorithms such as K-means clustering. However, because the propagation paths are invisible, the operator simply does not know by which object in the space each of the clusters are caused to be generated.

Figure 6:
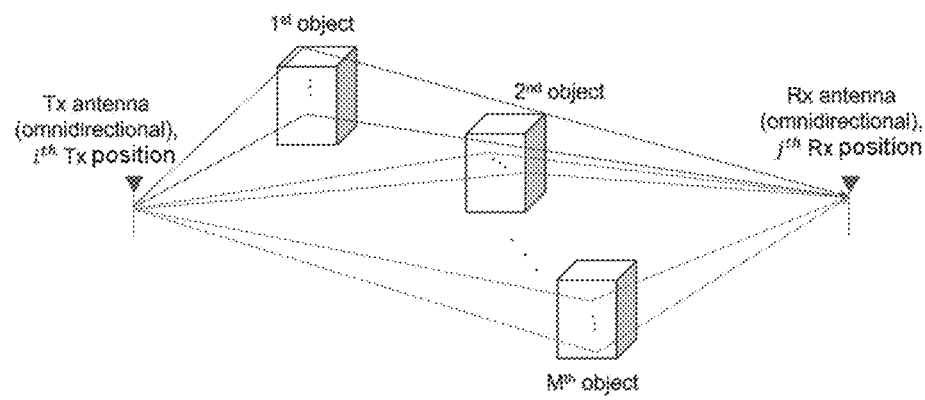
FIG. 6 is a conceptual diagram depicting a process of provisionally simulating a the propagation channel between a transmitter position and a receiver position in a three-dimensional environment map.

In operation 220, the provisional simulation of the propagation channel may be performed under the same condition as the actual measurement, that is, for the same transmitter position, receiver position, delay, angle of departure, and angle of arrival as those associated with each actual measurement data. FIG. 6 is a conceptual diagram depicting the process of provisionally simulating the propagation channel between the transmitter position and the receiver position in the 3D environment map. When the 3D environment map including shapes of the objects in the space and medium information is given, the propagation channel may be simulated based on the ray-tracing. The propagation channels obtained as a result of the provisional simulation may also be represented by the signal intensities as a function of the delay, the angle of departure, and the angle of arrival. The multipath components generated by the same object may have similar delays, angles of departure, and the angles of arrival and may show a cluster pattern. The reflection, the diffraction, and the scattering patterns of the multipath components in the 3D environment map may be identified in the provisional simulation result unlike in the actual propagation channel, and thus it is possible to identify the objects in the 3D environment map which have caused the clusters determined from the provisional simulation result. In this case also, the clustering of the multipath components may be achieved using the algorithms such as the K-means clustering.

Figure 7:
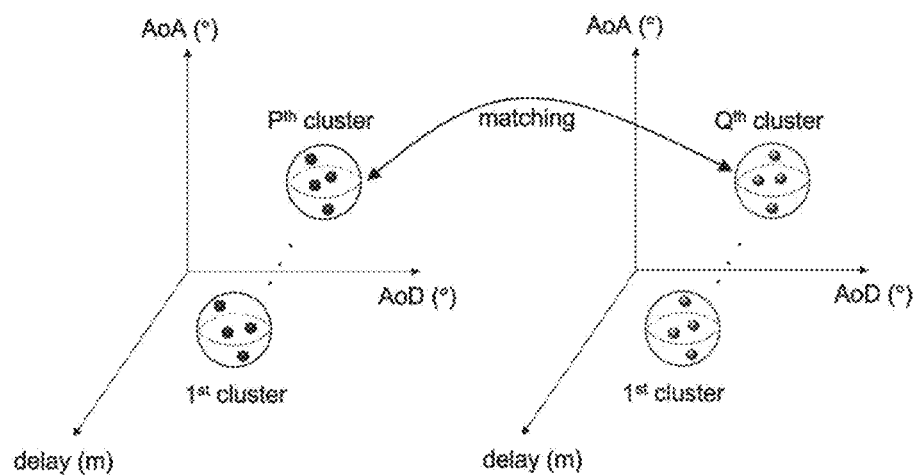
FIG. 7 is a conceptual diagram depicting a process of matching a first clusters set of multipath components obtained through actual measurements with a second clusters set of multipath components determined through provisional simulations.

In operation 230, two kinds of clusters may be matched with each other. That is, each cluster in the first clusters set, i.e., each cluster of the multipath components obtained through the actual measurements may be matched with at least one cluster in the second clusters set determined through the provisional simulation. FIG. 7 is a conceptual diagram depicting the process of matching the first clusters set with the second cluster sets. After the multipath components with similar delay, angle of departure, and angle of arrival are clustered, each of the clusters in the first clusters set obtained through the actual measurements may be matched with at least one of the clusters of the second clusters set determined through the provisional simulation by a threshold-based matching method, in which two clusters are matched when, for example, a distance difference between the multipath components is less than a threshold in a three-dimensional grid space of delay, angle of departure, and angle of arrival. However, a Multipath Component Distance based Density-Based Spatial Clustering of Applications with Noise (MCD-based DBSCAN) algorithm that performs the clustering and the matching processes simultaneously, may also be used.

Referring back to FIG. 4, in operation 240, each of the clusters may be mapped to one of the objects in the 3D environment map based on the information on the second clusters set of the multipath components determined through the provisional simulation and information on the 3D environment map. Next, for each object 40, the difference between the intensity of the actual multipath components and the intensity of the simulated multipath component for each condition of the delay, the angle of departure, and the angle of arrival may be calculated as the simulation error or intensity error value (operation 250).

After the intensity difference is calculated in the operation 250, it is determined whether the intensity difference has been calculated for all the possible receiver positions corresponding to the transmitter position where the actual measurements were made (operation 260). If the intensity difference has not been calculated for any of the receiver positions corresponding to the transmitter position, the index of the receiver position Rx_index is increased by one (operation 262), and the operations 210-260 are performed again to calculate the intensity difference for the next receiver position. If it is determined in the operation 260 that the intensity difference has been calculated for all the possible receiver positions corresponding to the transmitter position, it is determined whether the intensity difference has been calculated for all the possible transmitter positions (operation 270). If the intensity difference has not been calculated for any of the transmitter positions, the index of the transmitter position Tx_index is increased by one and the index of the receiver position Rx_index is reset to one (operation 272, and the operations 210-270 are performed to calculate the intensity difference for the next pair of the transmitter position and the receiver position.

By such a process, it is possible to calculate and accumulate the intensity differences for all the possible pairs of the transmitter position and the receiver position. Accordingly, the intensity difference may be determined for each object 40 in the 3D space and for each condition of the delay, the angle of departure, and the angle of arrival, and the simulation error may be stored in a form of the intensity error value according to the delay, the angle of departure, and the angle of arrival.

Though more actual measurement data may be obtained if the measurement is made for more pairs of the transmitter and receiver positions, it is impossible in any case to obtain the actual measurement data for all object in the 3D environment map and for all delays, the angles of departure, and the angles of arrival. Therefore, according to an exemplary embodiment, the intensity error values may be additionally determined by interpolating the intensity error values obtained through a comparison of the actual measurement data and the simulation data. The interpolation operation enables to generate the intensity error values for conditions of the delays, the angles of departure, and the angles of arrival for which the intensity error values do not exist in the 3D environment map.

In a state that a database 160 of the intensity error values to be used for the correction of the simulation results is equipped, the propagation channel simulation apparatus 10 performs the propagation channel simulation for arbitrary transmitter and receiver positions and correct the simulation result taking the intensity error values into account.

Figure 8:
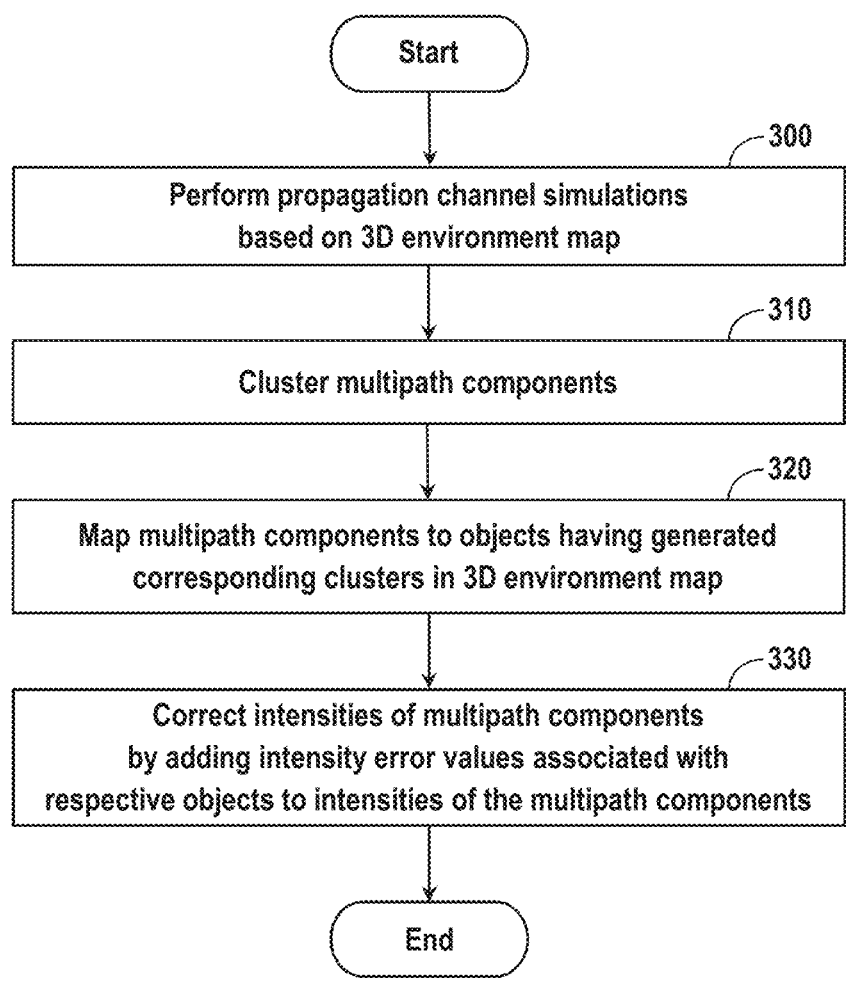
FIG. 8 is a flowchart showing a process of correcting a result of the propagation channel simulation for arbitrary transmitter and receiver positions using intensity error values.

FIG. 8 is a flowchart showing the process of correcting the result of the propagation channel simulation for arbitrary transmitter and receiver positions by applying the intensity error values.

First, the ray tracing-based propagation channel simulations are performed for arbitrary pairs of the transmitter and receiver positions based on the 3D environment map and multipath components are obtained (operation 300). Afterwards, the multipath signal components are clustered (operation 310). Next, the clusters are mapped to respective objects supposed to have generated the clusters in the 3D environment map, and the objects having caused the clusters to be generated are determined (operation 320). Finally, the intensities of the multipath signal components are corrected by adding the intensity error values associated with respective objects to the intensities of the multipath signal components (operation 330).

The apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of correcting propagation channel simulation data, comprising:
   determining an intensity error value of a propagation channel simulation model for a propagation path associated with each object in a space for which a three-dimensional (3D) environment map is given and storing the intensity error value in a storage device;
   performing a propagation channel simulation for an arbitrary pair of a transmitter position and a receiver position in the space to obtain multipath components;
   determining an object having influenced propagations of the multipath components in the space; and correcting an intensity of at least one of the multipath components by applying the intensity error value associated with a determined object stored in the storage device.

2. The method of claim 1, wherein determining the intensity error value of the propagation channel simulation model for the propagation path associated with each object comprises:
performing actual measurements of propagation channels for a plurality of pairs of a transmitter position and a receiver position, performing provisional propagation channel simulations for the plurality of pairs of the transmitter position and the receiver position, and matching a first cluster of multipath components obtained through the actual measurements with a second cluster of multipath components obtained through the provisional propagation channel simulations;
mapping the first or the second cluster to an object in the space; and
calculating a difference between the first cluster of multipath components and the second cluster of multipath components with respect to a mapped object to store the difference as the intensity error value for the propagation path associated with the mapped object.

3. The method of claim 2, wherein performing the actual measurements of the propagation channels, performing the provisional propagation channel simulations, and matching the first cluster of multipath components with the second cluster of multipath components comprises:
performing the actual measurements of the propagation channels for the plurality of pairs of the transmitter position and the receiver position in the space to obtain the first cluster of multipath components;
performing the provisional propagation channel simulations for the plurality of pairs of the transmitter position and the receiver position associated with the actual measurements to obtain the second cluster of multipath components; and
matching the first cluster of multipath components with the second cluster of multipath components.

4. The method of claim 2, wherein each of actual measurement data and each of provisional simulation data comprises a delay, an angle of departure, an angle of arrival, and a signal intensity,
wherein the intensity error value is determined as a function of the delay, the angle of departure, and the angle of arrival for each object in the space and stored in the storage device.

5. The method of claim 2, further comprising:
interpolating calculated intensity error values to supplement the intensity error values for the delay, the angle of departure, and the angle of arrival for which the intensity error values are not calculated from the first cluster of multipath components and the second cluster of multipath components.

6. The method of claim 1, wherein correcting the intensity of at least one of the multipath components by applying the intensity error value associated with the determined object comprises:
adding the intensity error value associated with the determined object to the intensity of the at least one of the multipath components.

7. A propagation channel simulation method, comprising:
performing a propagation channel simulation for a pair of a transmitter position and a receiver object in a space for which a three-dimensional (3D) environment map is given to obtain multipath components;
determining an object having influenced propagations of the multipath components in the space; and
correcting an intensity of at least one of the multipath components by applying a predetermined intensity error value for the object.

8. The propagation channel simulation method of claim 7, further comprising:
determining the predetermined intensity error value of a propagation channel simulation model for a propagation path associated with each object in the space and storing the predetermined intensity error value in a storage device before performing the propagation channel simulation.

9. The propagation channel simulation method of claim 8, wherein determining the predetermined intensity error value of the propagation channel simulation model for the propagation path associated with each object comprises:
performing actual measurements of propagation channels for a plurality of pairs of a transmitter position and a receiver position, performing provisional propagation channel simulations for the plurality of pairs of the transmitter position and the receiver position, and matching a first cluster of multipath components obtained through the actual measurements with a second cluster of multipath components obtained through the provisional propagation channel simulations;
mapping the first or the second cluster to an object in the space; and
calculating a difference between the first cluster of multipath components and the second cluster of multipath components with respect to a mapped object to store the difference as the intensity error value for the propagation path associated with the mapped object.

10. The propagation channel simulation method of claim 9, wherein performing the actual measurements of the propagation channels, performing the provisional propagation channel simulations, and matching the first cluster of multipath components with the second cluster of multipath components comprises:
performing the actual measurements of the propagation channels for the plurality of pairs of the transmitter position and the receiver position in the space to obtain the first cluster of multipath components;
performing the provisional propagation channel simulations for the plurality of pairs of the transmitter position and the receiver position associated with the actual measurements to obtain the second cluster of multipath components; and
matching the first cluster of multipath components with the second cluster of multipath components.

11. The propagation channel simulation method of claim 9, wherein each of actual measurement data and each of provisional simulation data comprises a delay, an angle of departure, an angle of arrival, and a signal intensity,
wherein the intensity error value is determined as a function of the delay, the angle of departure, and the angle of arrival for each object in the space and stored in the storage device.

12. The propagation channel simulation method of claim 9, further comprising:
interpolating calculated intensity error values to supplement the intensity error values for the delay, the angle of departure, and the angle of arrival for which the intensity error values are not calculated from the first cluster of multipath components and the second cluster of multipath components.

13. A propagation channel simulation apparatus, comprising:
a memory storing program instructions; and
a processor coupled to the memory and executing the program instructions stored in the memory,
wherein the program instructions, when executed by the processor, causes the processor to:
perform a propagation channel simulation for a pair of a transmitter position and a receiver object in a space for which a three-dimensional (3D) environment map is given to obtain multipath components;
determine an object having influenced propagations of the multipath components in the space; and
correct an intensity of at least one of the multipath components by applying a predetermined intensity error value for the object.

14. The propagation channel simulation apparatus of claim 13, wherein the program instructions, when executed by the processor, causes the processor to:
determine the predetermined intensity error value of a propagation channel simulation model for a propagation path associated with each object in the space and storing the predetermined intensity error value in a storage device before performing the propagation channel simulation.

15. The propagation channel simulation apparatus of claim 14, wherein the program instructions causing the processor to determine the predetermined intensity error value of the propagation channel simulation model for the propagation path associated with each object causes the processor to:
perform actual measurements of propagation channels for a plurality of pairs of a transmitter position and a receiver position, perform provisional propagation channel simulations for the plurality of pairs of the transmitter position and the receiver position, and match a first cluster of multipath components obtained through the actual measurements with a second cluster of multipath components obtained through the provisional propagation channel simulations;
map the first or the second cluster to an object in the space; and
calculate a difference between the first cluster of multipath components and the second cluster of multipath components with respect to a mapped object to store the difference as the intensity error value for the propagation path associated with the mapped object.

16. The propagation channel simulation method of claim 15, wherein the program instructions causing the processor to perform the actual measurements of the propagation channels, perform the provisional propagation channel simulations, and match the first cluster of multipath components with the second cluster of multipath components causes the processor to:
perform the actual measurements of the propagation channels for the plurality of pairs of the transmitter position and the receiver position in the space to obtain the first cluster of multipath components;
perform the provisional propagation channel simulations for the plurality of pairs of the transmitter position and the receiver position associated with the actual measurements to obtain the second cluster of multipath components; and
match the first cluster of multipath components with the second cluster of multipath components.

17. The propagation channel simulation apparatus of claim 15, wherein each of actual measurement data and each of provisional simulation data comprises a delay, an angle of departure, an angle of arrival, and a signal intensity,
wherein the intensity error value is determined as a function of the delay, the angle of departure, and the angle of arrival for each object in the space and stored in the storage device.

18. The propagation channel simulation apparatus of claim 15, wherein the program instructions, when executed by the processor, further causes the processor to:
interpolate calculated intensity error values to supplement the intensity error values for the delay, the angle of departure, and the angle of arrival for which the intensity error values are not calculated from the first cluster of multipath components and the second cluster of multipath components.

* * * * *